(12) United States Patent
Miao et al.

(10) Patent No.: US 10,615,853 B2
(45) Date of Patent: Apr. 7, 2020

(54) BEAMFORMING DEVICE

(71) Applicant: Intel IP Corporation, Santa Clara, CA (US)

(72) Inventors: Honglei Miao, Munich (DE);
Bernhard Raaf, Neuried (DE);
Michael Faerber, Wolfratshausen (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/745,141

(22) PCT Filed: Jun. 17, 2016

(86) PCT No.: PCT/EP2016/064042
§ 371 (c)(1),
(2) Date: Jan. 16, 2018

(87) PCT Pub. No.: WO2017/012803
PCT Pub. Date: Jan. 26, 2017

(65) Prior Publication Data
US 2018/0212653 A1 Jul. 26, 2018

(30) Foreign Application Priority Data
Jul. 17, 2015 (DE) .................. 10 2015 111 638

(51) Int. Cl.
*H04B 7/0452* (2017.01)
*H04B 7/0408* (2017.01)
*H04L 5/00* (2006.01)

(52) U.S. Cl.
CPC ......... *H04B 7/0452* (2013.01); *H04B 7/0408* (2013.01); *H04L 5/0044* (2013.01)

(58) Field of Classification Search
CPC ... H04B 7/0408; H04B 7/0452; H04L 5/0044; H04L 5/00
(Continued)

(56) References Cited

U.S. PATENT DOCUMENTS 7,742,788 B2 * 6/2010 Frank .................. H04B 7/0408
455/25
8,457,698 B2 * 6/2013 Samardzija ............ H01Q 1/246
455/552.1
(Continued)

FOREIGN PATENT DOCUMENTS

WO 2014035102 A1 3/2014
WO 2014104114 A1 7/2014

OTHER PUBLICATIONS

German Office Action based on application No. 10 2015 111 638.3 (10 pages and 7 pages of English translation) dated Feb. 4, 2016 (Reference Purpose Only).
(Continued)

Primary Examiner — Man U Phan

(57) ABSTRACT

The disclosure relates to a beamforming device (200), including: a first beamforming circuit (201) configured to generate a first beam (211) based on a first set of beamforming coefficients; a second beamforming circuit (202) configured to generate a second beam (212) based on a second set of beamforming coefficients; and a scheduling circuit (203) configured to allocate (204, 206) a first set of frequency resources, a second set of frequency resources, the first set of beamforming coefficients and the second set of beamforming coefficients to a plurality of mobile stations (UE0, UE1, UE2) based on an optimality criterion related to a target scheduling metric.

25 Claims, 6 Drawing Sheets

(58) Field of Classification Search
USPC .......................................................... 370/534
See application file for complete search history.

(56) References Cited

U.S. PATENT DOCUMENTS

| | | | | |
|---|---|---|---|---|
| 8,625,693 B2* | 1/2014 | Tsai | ...................... | H04B 7/0617 |
| | | | | 375/267 |
| 9,544,855 B2* | 1/2017 | Jeong | .................. | H04W 52/146 |
| 10,172,135 B2* | 1/2019 | Deng | .................. | H04W 72/046 |
| 2007/0249402 A1 | 10/2007 | Dong et al. | | |
| 2008/0002733 A1* | 1/2008 | Sutskover | ............. | H04L 5/0023 |
| | | | | 370/436 |
| 2013/0231059 A1 | 9/2013 | Prasad et al. | | |
| 2014/0161018 A1 | 6/2014 | Chang et al. | | |
| 2015/0003406 A1 | 1/2015 | Athley et al. | | |
| 2015/0207547 A1 | 7/2015 | Ko et al. | | |
| 2015/0358064 A1 | 12/2015 | Benjebbour et al. | | |
| 2016/0006122 A1* | 1/2016 | Seol | ...................... | H04L 1/0006 |
| | | | | 342/372 |
| 2016/0135090 A1* | 5/2016 | Krishnamoorthy | ... | H04W 16/28 |
| | | | | 370/329 |
| 2016/0192387 A1* | 6/2016 | Bae | .................... | H04W 72/1278 |
| | | | | 370/329 |
| 2018/0123675 A1* | 5/2018 | Shi | ....................... | H04B 7/0695 |

OTHER PUBLICATIONS

International Search Report based on application No. PCT/EP2016/064042 (6 pages) dated Nov. 11, 2016 (Reference Purpose Only).

* cited by examiner

BEAMFORMING DEVICE

RELATED APPLICATIONS

The present application is a national stage entry according to 35 U.S.C. § 371 of PCT application No.: PCT/EP2016/064042 filed on Jun. 17, 2016, which claims priority from German application No.: 10 2015 111 638.3 filed on Jul. 17, 2015, and is incorporated herein by reference in its entirety.

FIELD

The disclosure relates to a beamforming device and to a method and device for allocating a plurality of beamformers to a plurality of mobile stations. In particular, the disclosure relates to techniques for beam-frequency scheduling for millimeter wave downlink multiplexing.

BACKGROUND

Millimeter wave (mmW) communication has been considered as an important technology to be employed for modern communication standards such as the future 5G mobile system. To mitigate the severe path loss due to very high frequency, beamforming technique becomes a crucial technique to achieve reasonable link budgets. It is envisioned that so called pencil beams with very narrow beamwidths, e.g., 5 to 15 degrees, offering high beamforming gain have to be widely used. Moreover, due to the fact that digital beamforming may be too costly or require too much power to be implemented in practical mmW system, analog beamformers comprised of networks of phase shifters and possibly variable attenuators or amplifiers are typically employed. The more beams are to be generated, the more phase shifters, combiners and possibly attenuators are required, therefore it may not be commercially feasible to provide as many beams as UEs. To transmit multiple parallel beams in parallel, mmW access point (AP) can be equipped with multiple beamformers, each of which illuminates a different beam direction. In addition to higher throughput, modern communication standards such as the future 5G mobile system are also targeting to lower latency and better spectrum efficiency.

Hence, there is a need to improve beamforming with respect to high beamforming gain, low latency and high spectrum efficiency. In particular for cases where there are more UEs than available beams reducing latency is a critical issue.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
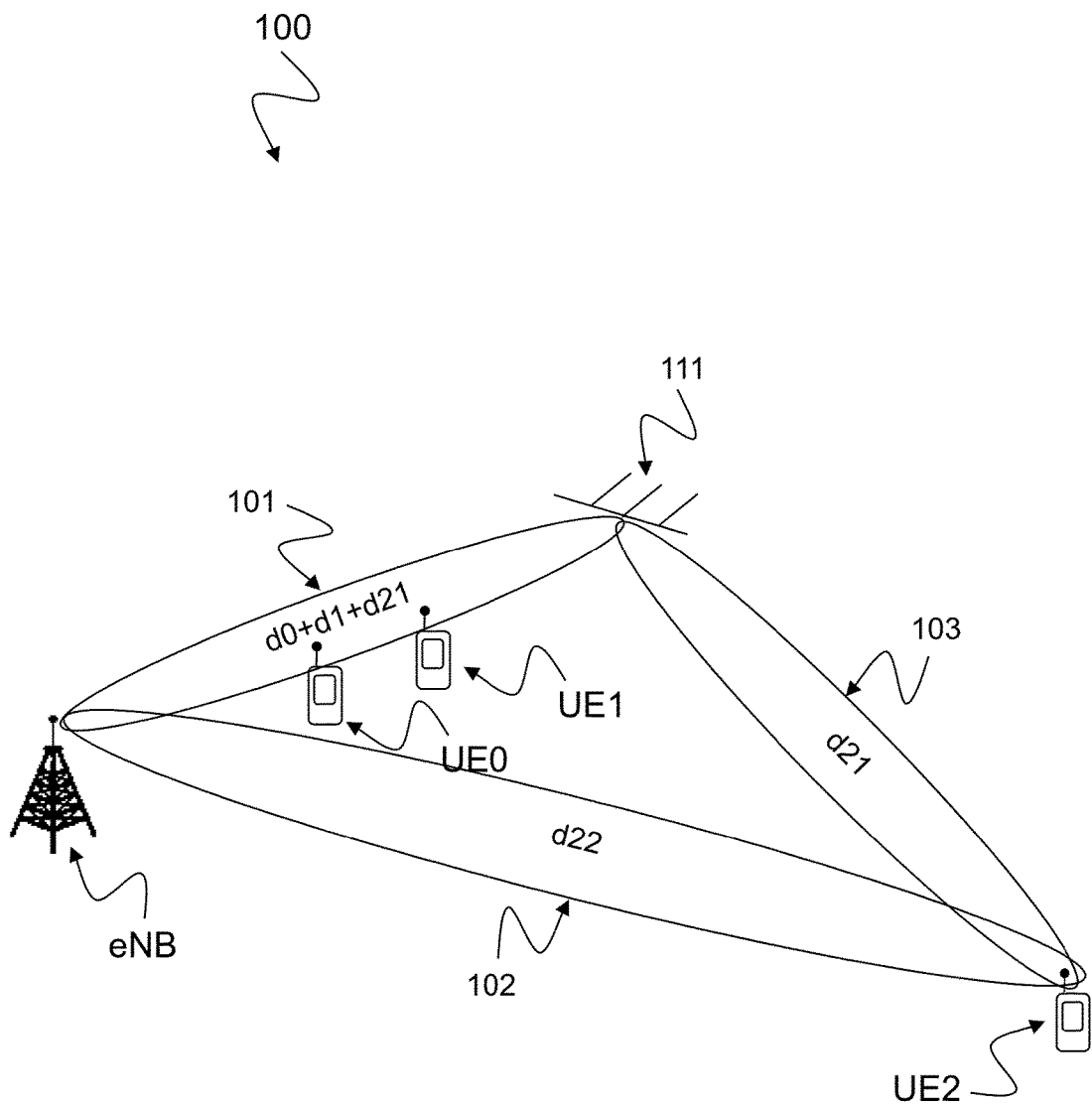
FIG. 1 is a schematic diagram illustrating a beamforming system 100.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

It should be noted that the terminology "beam" in this disclosure refers to the analog beam direction instead of the "eigenbeam" obtained by the digital beamforming technique.

The following terms, abbreviations and notations will be used herein:
3GPP: 3rd Generation Partnership Project,
LTE: Long Term Evolution,
LTE-A: LTE Advanced, Release 10 and higher versions of 3GPP LTE,
RF: Radio Frequency,
mmW: Millimeter Wave,
TTI: Transmission Time Interval,
UE: User Equipment or mobile station,
eNodeB: base station,
MIMO: Multiple Input Multiple Output,
AP: Access Point,
MAC: Medium Access Control,
LOS: Line Of Sight,
FDMA: Frequency Division Multiple Access,
SDMA: Space Division Multiple Access,
CQI: Channel Quality Index,
CSI: Channel State Information.

The methods and devices described herein may be based on beamformers and beamforming circuits in network nodes such as eNBs, base stations, relay stations and mobile stations. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular 5G. The methods and devices described below may be implemented in network nodes and base stations. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein may be configured to transmit and/or receive millimeter wave (mmW) signals. Millimeter waves are radio waves in the electromagnetic spectrum from about 30 GHz to about 300 GHz. Radio frequencies in this band have wavelengths from about ten to one millimeter, giving it the name millimeter band or millimeter wave.

The methods and devices described herein after may be designed in accordance to mobile communication standards such as e.g. the Long Term Evolution (LTE) standard or the advanced version LTE-A thereof. LTE (Long Term Evolution), marketed as 4G LTE and 5G LTE, is a standard for wireless communication of high-speed data for mobile phones and data terminals.

The methods and devices described hereinafter may be applied in OFDM systems. OFDM is a scheme for encoding data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in MIMO systems and diversity receivers. Multiple-input multiple-output (MIMO) wireless communication systems employ multiple antennas at the transmitter and/or at the receiver to increase system capacity and to achieve better quality of service. In spatial multiplexing mode, MIMO systems may reach higher peak data rates without increasing the bandwidth of the system by transmitting multiple data streams in parallel in the same frequency resources. A diversity receiver uses two or more antennas to improve the quality and reliability of a wireless link.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

FIG. 1 is a schematic diagram illustrating a beamforming system 100. The beamforming system 100 includes a beamforming device eNB implemented in an eNodeB, e.g. a base station, and a plurality of mobile devices, also denoted as mobile stations or user equipments UE0, UE1, UE2. The beamforming device eNB generates a first beam 101 and a second beam 102. The first beam 101 is allocated for a first mobile station UE0 (allocation d0), a second mobile station UE1 (allocation d1) and a third mobile station UE2 (allocation d21). The first beam 101 is reflected by a wall 111 thereby generating a third beam 103 that is allocated for the third mobile station UE2. The second beam 102 is also allocated for the third mobile station UE2 (allocation d22).

Hence, FIG. 1 illustrates the basic principle described in the disclosure, that is, to jointly allocate the beamformers and frequency resources to UEs so as to take full advantage of available beamforming capability as well as to maximize the target scheduling metric. More specifically, the beamforming techniques according to the disclosure pick beamformers and make them serve as much throughput as possible, also allowing one beamformer to serve two or more UEs in different subbands when multiple UEs are in coverage of the same beam. As a result, FDMA of multiple UEs using same beam and single UE transmitting with multibeams are supported simultaneously to maximize the overall data rate and reduce latency.

In the current LTE system, according to certain scheduling criteria such as proportional fair rule, and radio bearers' priorities, the scheduler operation is typically partitioned into two steps, namely time domain scheduler followed by the frequency domain scheduler and with possible iterations between them. In addition to the frequency resources, mmW system has also taken the restrictions from physical analog beamformer into account for the UE bearer scheduling. For example, with only two physical analog beamformers equipped at the mmW AP, it is challenging or even not possible to allocate more than two bearers with very different preferred beam directions. As a consequence, the multiple UEs or bearers scheduler in the medium access control (MAC) layer need to take the constraints with respect to both frequency resources and physical beamformers into account. For implementing the beamforming system 100 there are system constraints and prerequisites as described in the following.

A system constraint is that a mmW AP is equipped with a limited number of physical analog beamformers, i.e., a finite number of parallel beams can be transmitted at the same TTI. A prerequisite is that each mmW AP has the knowledge about the channel quality q of each attached UE at each resource pair of $\{f, b\}$, where f defines the frequency sub band index, and b refers to the beam sector index, or pencil-beam index. Such channel quality can be obtained from the UE feedback. This may sound like excessive knowledge given the number of supported beams and UEs. However, due to LOS or ray-tracing geometries, only a few beam directions are actually relevant per UE, thus the required feedback information is feasible.

This disclosure presents an efficient practical scheduling method to allocate radio bearers or UEs to achieve good performance in terms of overall weighted sum rates subject to the relevant physical constraints. As a result, the system 100 provides both, reduction of transmit time interval (TTI) in the physical layer and intra-TTI co-scheduling of UEs using FDMA and/or SDMA. The system 100 allows multiple users to be scheduled in the same TTI with joint FDMA and SDMA.

The detailed mathematical modeling of the beamforming system 100 is described below with respect to FIG. 6.

Figure 2:
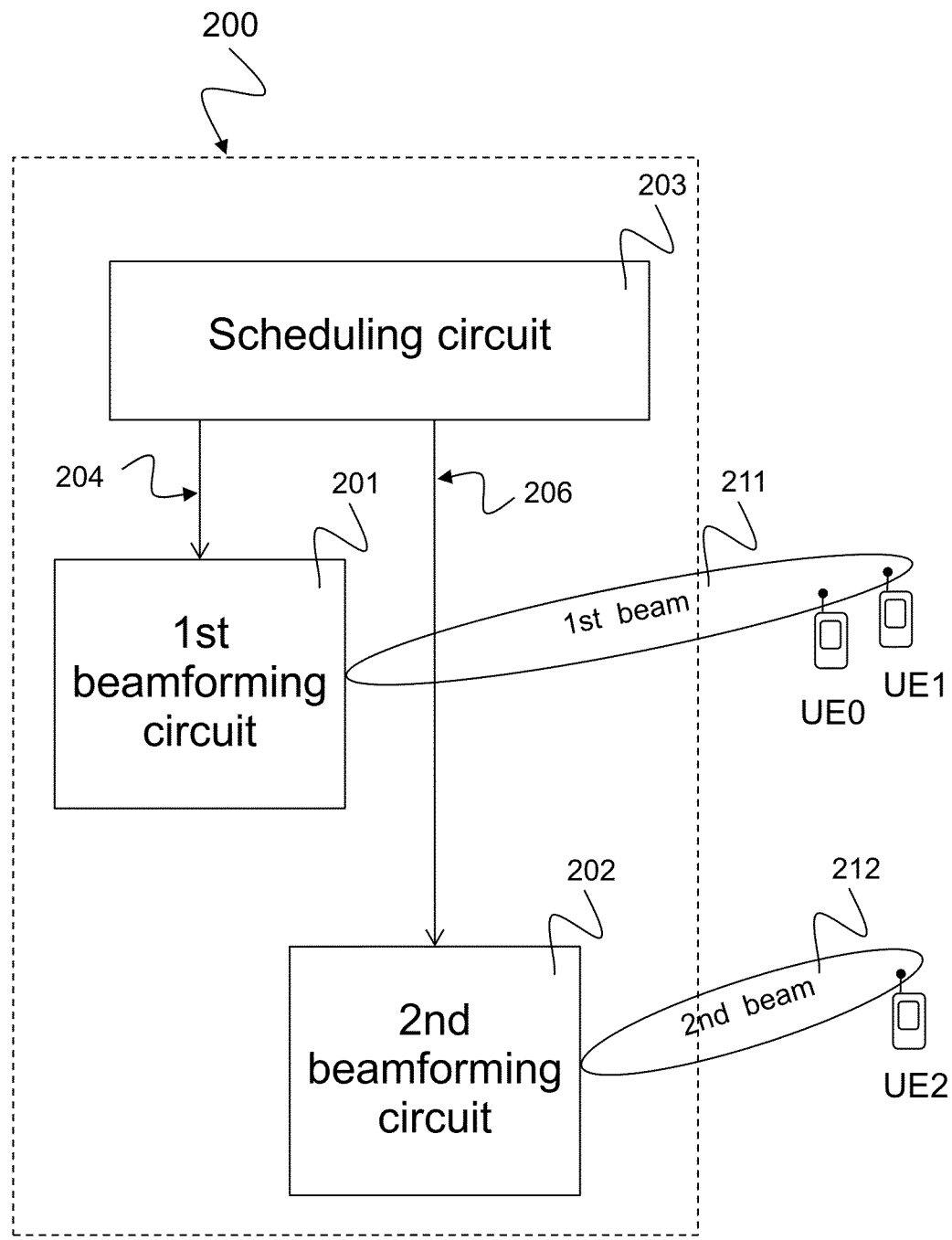
FIG. 2 is a block diagram illustrating an exemplary beamforming device 200.

FIG. 2 is a block diagram illustrating an exemplary beamforming device 200. The beamforming device 200 includes a first beamforming circuit 201, a second beamforming circuit 202 and a scheduling circuit 203.

The first beamforming circuit 201 generates a first beam 211 based on a first set of beamforming coefficients, e.g. analog beamforming coefficients. The second beamforming circuit 202 generates a second beam 212 based on a second set of beamforming coefficients, e.g. analog beamforming coefficients. The scheduling circuit 203 allocates a first set of frequency resources 204, a second set of frequency resources 206, the first set of beamforming coefficients and the second set of beamforming coefficients to a plurality of mobile stations UE0, UE1, UE2 based on an optimality criterion related to a target scheduling metric.

The first set of frequency resources and the second set of frequency resources may at least partially overlap. The scheduling circuit 203 may jointly allocate 204, 206 the first and second sets of frequency resources and the first and second sets of beamforming coefficients to the plurality of mobile stations UE0, UE1, UE2.

The scheduling circuit 203 may allocate the first and second sets of frequency resources and the first and second sets of beamforming coefficients to the plurality of mobile stations UE0, UE1, UE2 during a same transmission time interval.

The scheduling circuit 203 may allocate the first set of frequency resources and the first set of beamforming coefficients for generating the first beam 211 to a first set of mobile stations UE1, UE2. In particular, the first and second set of frequency resources may overlap, they may contain multiple frequencies in common.

The scheduling circuit 203 may allocate the second set of frequency resources and the second set of beamforming coefficients for generating the second beam 212 to a second set of mobile stations UE2. In particular, two independent beams and frequencies may be used for two UEs or alternatively, the same beam may also be used for other UEs. There may be any combination of the first beam and the second beam and any combination of the frequency resources to serve one or multiple UEs.

One or multiple same mobile stations may be included in both the first set and the second set of mobile stations. The first beamforming circuit and the second beamforming circuit may provide the same beam, i.e. the first beam or the second beam respectively directed in the same direction to at least one mobile station.

A wavelength of the first beam 211 and the second beam 212 may be in a millimeter range. A frequency range of the first beam 211 and the second beam 212 may lie between approximately 6 GHz and approximately 100 GHz or between approximately 10 GHz and approximately 100 GHz.

The scheduling circuit 203 may allocate the sets of frequency resources and the sets of beamforming coefficients such that the first beam 211 and the second beam 212 are directed to different preferred beam directions.

The target scheduling metric may be based on a weighted target data rate derived from channel quality indicator. The optimality criterion may be based on achieving the target scheduling metric.

The beamformers described above may be based on the analog beamforming coefficients assuming that the same direction will work out on all frequencies. However, the beamformers may provide frequency-dependent beam directions either based on providing the respective beams based on the respective sets of frequency resources or by control of the scheduling algorithm. The first and second beamformers do not only have to operate on the respective first and second frequency resources. The first and second sets of frequency resources may overlap or contain some frequencies in common.

Figure 3:
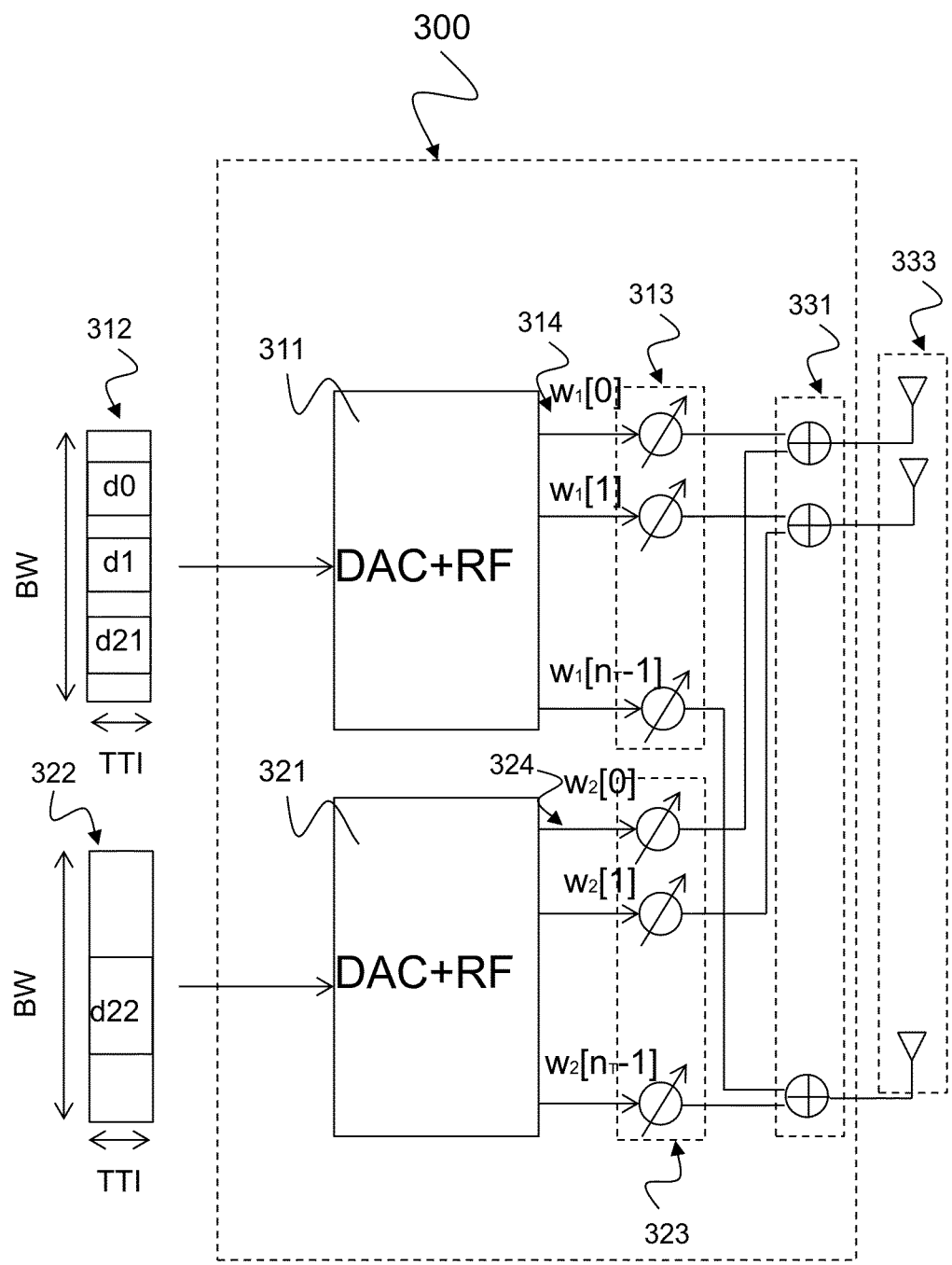
FIG. 3 is a block diagram illustrating an exemplary beamforming device 300 scheduling more UEs than available beamformers.

FIG. 3 is a block diagram illustrating an exemplary beamforming device 300 scheduling more UEs than available beamformers. The beamforming device 300 includes a first beamforming circuit 311 with a first set of analog beamforming coefficients 313, a second beamforming circuit 321 with a second set of analog beamforming coefficients 323, a set of combiners 331 and a scheduling circuit (not depicted in FIG. 3).

The first beamforming circuit 311 includes a digital-to-analog converter (DAC) and a radio frequency section (RF) for providing multiple first beamforming signals 314 based on first frequency resources 312. The first set 313 of analog beamforming coefficients is used to weight the multiple first beamforming signals 314 with respective weights $w_1[0]$, $w_1[1]$, ... $w_1[n-1]$, denoted as the first analog beamforming coefficients. These weights may be applied via variable phase shifters or variable attenuators or amplifiers or a combination thereof.

The second beamforming circuit 321 includes a digital-to-analog converter (DAC) and a radio frequency section (RF) for providing multiple second beamforming signals 324 based on second frequency resources 322. The second set 323 of analog beamforming coefficients is used to weight the multiple second beamforming signals 324 with respective weights $w_2[0]$, $w_2[1]$, ... $w_2[n-1]$, denoted as the second analog beamforming coefficients. The set of combiners 331 combines a respective weighted first beamforming signal 314 with a respective weighted second beamforming signal 324 to produce multiple beams at multiple antenna ports 333.

In the example of FIG. 3, a first set of frequency resources or a first frequency resource signal 312 includes a first frequency bandwidth d0, a second frequency bandwidth d1 and a third frequency bandwidth d21. A second set of frequency resources or a second frequency resource signal 322 includes a fourth frequency bandwidth d22. The beamforming device 300 may include a less number of beamformers than available antenna ports. That means that the antenna ports may receive signal combinations from respective beamformers, e.g. combined by the combiner 331. The combiner 331 may have a different structure than shown in FIG. 3. For example, the combiner 331 may implement selective combining of signals from the beamformers. The combiner 331 may implement additive combining of the input signals or weighted combining or other kinds of combinations such as multiplication or division etc. In some embodiments, some or all antennas may only receive signals from one beamforming circuit 311, 321, thus not needing a combiner.

In an exemplary scheduling of the beamforming device 300, the first frequency bandwidth d0 of the first frequency resource signal 312 may be allocated to the first mobile station UE0 as described above with respect to FIG. 1; the second frequency bandwidth d1 of the first frequency resource signal 312 may be allocated to the second mobile station UE1; and the third frequency bandwidth d21 of the first frequency resource signal 312 and the fourth frequency bandwidth d22 of the second frequency resource signal 322 may both be allocated to the third mobile station UE2 as described above with respect to FIG. 1.

The scheduling circuit that is not depicted in FIG. 3 may allocate the first set of frequency resources 312, the second set of frequency resources 322, the first set of beamforming coefficients 313 and the second set of beamforming coefficients 323 to a plurality of mobile stations, e.g. UE0, UE1, UE2 as depicted in FIG. 1 according to an optimality criterion with respect to a target scheduling metric.

When using the beamforming device 300 in the beamforming system 100 depicted in FIG. 1, three UEs, namely UE0, UE1 and UE2 are served by mmW AP which is equipped with only two RF beamformers 311, 321. UE0 and UE1 are in the coverage of the same beam 101, and UE2 can receive signals from two beams 102, 103, one of which is same as the one for UE0 and UE1, i.e., shared beam 103. A possible outcome of the scheduler is illustrated in FIG. 3, where two beams 101, 102 are transmitted, one is a shared beam 101, 103 carrying the data for all UEs with FDMA, and the other 102 is dedicated for UE2 which has the highest data rate demand in this example. This example shows that the FDMA and SDMA may be automatically supported by the beamforming device 300.

The scheduling circuit may implement a method 400 as described below with respect to FIG. 4 or an algorithm 600 as described below with respect to FIG. 6. In one example, the scheduling circuit may correspond to the scheduling device 500 described below with respect to FIG. 5. In one example, blocks implemented in the scheduling circuit of the beamforming device 300 are as follows:

In a zeroth block all beamformers are set to be unscheduled.

In a first block the scheduling metric is determined based on the weighted sum rate for each reported beam direction in the unscheduled beamformers, where the data rate for each frequency subband is allocated to a UE so that the overall target scheduling metric can be maximized.

In a second block, the beam direction with the maximum scheduling metric is selected, and the frequency resource is allocated according to the rate to UE allocation calculated in the first block.

In a third block, the allocated beamformer is removed from the set of unscheduled beamformers.

In a fourth block, the target scheduling metric is recalculated by removing the contribution from the scheduled beamformer determined in block 2.

In a fifth block, a return to first block is performed until either all the beamformers are scheduled or the target scheduling metric is achieved.

Exemplary blocks above can be either combined or split further to multiple steps, but the basic principle and procedure are captured.

Figure 4:
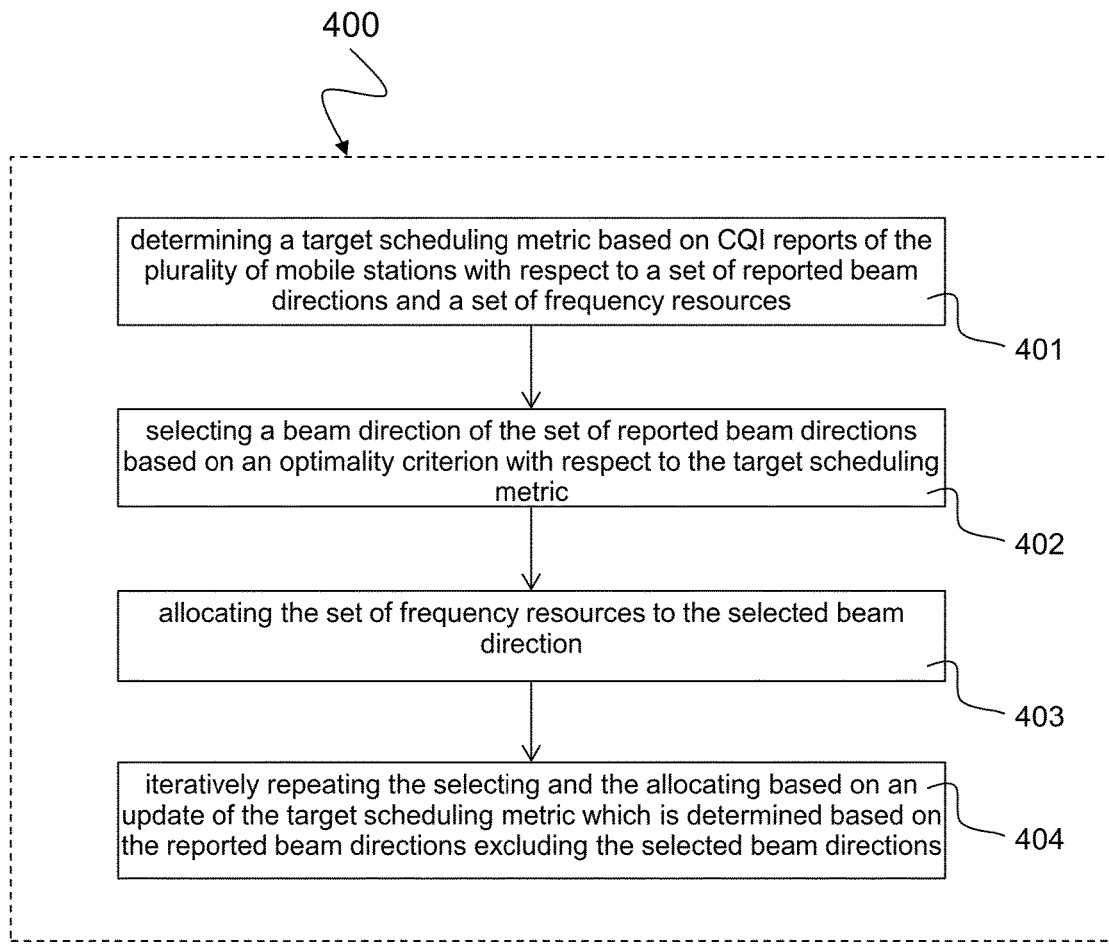
FIG. 4 schematically illustrates an exemplary method 400 for allocating a plurality of beamformers to a plurality of mobile stations.

FIG. 4 schematically illustrates an exemplary method 400 for allocating a plurality of beamformers to a plurality of mobile stations.

The method 400 includes the following blocks: Determining 401 a target scheduling metric based on channel quality index (CQI) reports of the plurality of mobile stations with respect to a set of reported beam directions and a set of frequency resources; selecting 402 a beam direction of the set of reported beam directions based on an optimality criterion related to the target scheduling metric; allocating 403 the set of frequency resources to the selected beam direction; and iteratively repeating 404 the selecting and the allocating based on an update of the target scheduling metric which is determined based on the reported beam directions excluding the selected beam directions.

The method 400 may include iteratively repeating 404 the selecting and the allocating based on the update of the target scheduling metric until the update of the target scheduling metric is equal to a predetermined value or all beamformers are scheduled.

The target scheduling metric may be based on a channel quality indicator or a weighted target date rate or data rate derived from a channel quality indicator that may be derived from the channel quality index reports. The optimality criterion may be based on achieving the target scheduling metric.

A respective set of frequency resources may be assigned to each beamformer.

The optimality criterion may be subject to the restriction that only one beam direction is transmitted by any one of the plurality of beamformers in a transmission time interval.

The optimality criterion may be subject to the restriction that the frequency resources in the respective frequency resource set may be iteratively selected and allocated to one same or different mobile station based on achieving the target scheduling metric or based on the updated target scheduling metric.

The selected beam direction with respect to the target scheduling metric may be directed to one or multiple mobile stations of the plurality of mobile stations. The method 400 may include allocating one frequency resource of the set of frequency resources and one beam direction of the set of reported beam directions to one mobile station of the plurality of mobile stations. Alternatively or additionally, the method 400 may include allocating one frequency resource of the set of frequency resources to at least two mobile stations via different beam directions.

The selected beam direction with respect to the target scheduling metric and the selected beam direction with respect to the updated target scheduling metric may be directed to different mobile stations of the plurality of mobile stations.

The selected beam direction with respect to the target scheduling metric may be directed to one or multiple mobile stations of the plurality of mobile stations. The selected beam direction with respect to the target scheduling metric and the selected beam direction with respect to the updated target scheduling metric may be directed to one or multiple same mobile station of the plurality of mobile stations.

The method 400 provides a combination of two beamforming solutions as described in the following. The first beamforming solution is to employ TDMA only to multiplex multiple UEs, where only one UE is scheduled in a TTI. The other beamforming solution is to have several beamformers in the mmW AP and allocate each UE to a dedicated beamformer so that SDMA can be realized. However, this approach limits the UE multiplexing capability to be the number of physical beamformers equipped at the mmW AP.

The combined solution of the method 400 as presented in FIG. 4 is to jointly allocate the beamformer and frequency resources to all the considered UEs, each beam-frequency subband allocated to a UE so that the contribution to the overall target scheduling metric can be maximized. This combined solution maximizes the utilization efficiency of available frequency-beamformer resources in terms of target scheduling metric. Both beam-selective and frequency-selective scheduling gains for all the UEs are realized and multi-stream transmission for a UE is also supported.

Hence, the method 400 enables multiple UEs to be scheduled in the same TTI for the OFDMA based downlink mmW system, this significantly improves the scheduling flexibility of the system, improves the system overall efficiency and reduces the UE communication latency as well. Note that some UEs may not necessarily be served via the beam that is optimal for them, but using a beam that is already scheduled for other UEs allows these UEs to be scheduled at the same time, thereby reducing latency for these UEs because they don't have to wait until the optimal beam has been scheduled. For example UE2 may be served via the beam 103 i.e. the reflection of beam 101 even though beam 102 may be the optimum beam. This allows in a further embodiment to use the second beamforming circuit 202 to serve a further UE (not shown in FIG. 1 or FIG. 2) thus reducing latency for that further UE.

Figure 5:
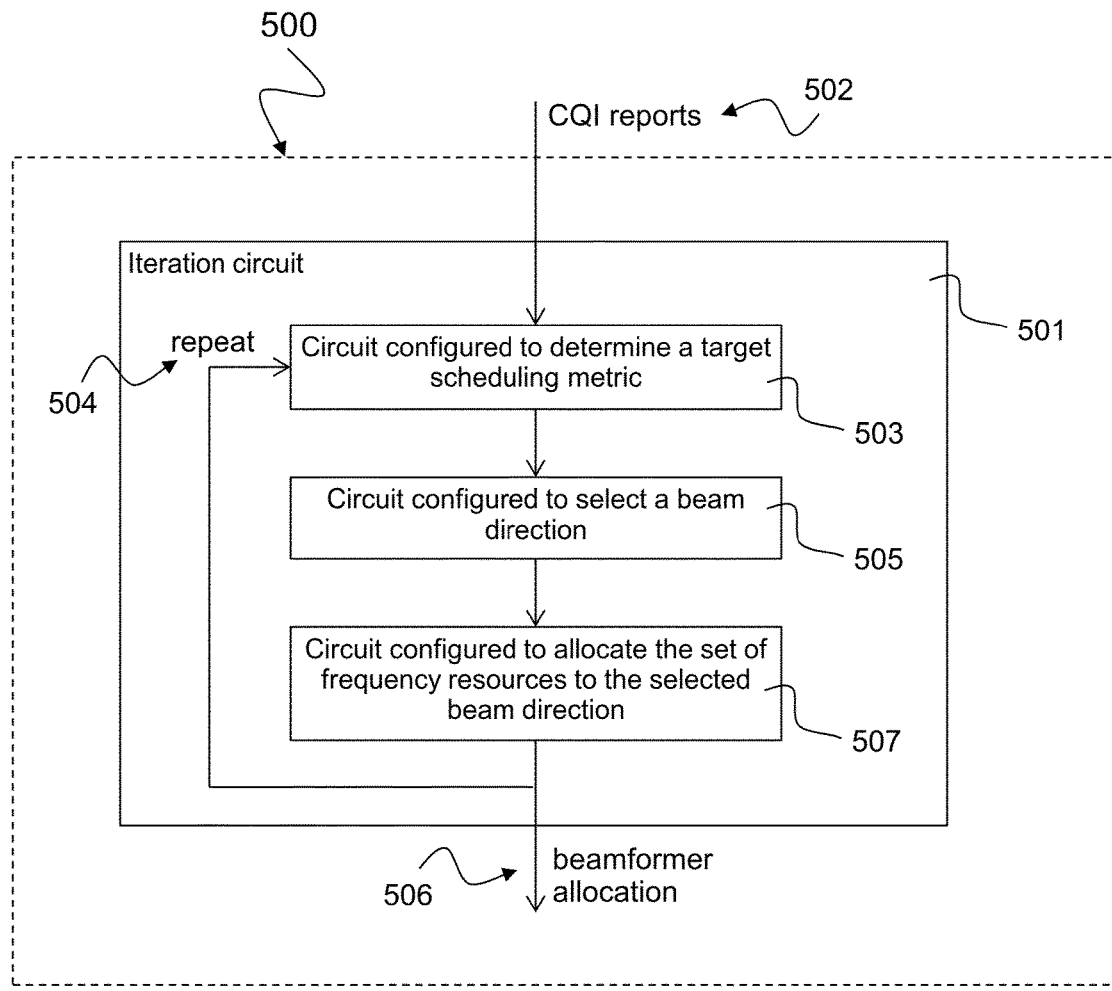
FIG. 5 is a block diagram of an exemplary scheduling device 500 allocating a plurality of beamformers to a plurality of mobile stations.

FIG. 5 is a block diagram of an exemplary scheduling device 500 allocating a plurality of beamformers to a plurality of mobile stations.

The scheduling device 500 includes a first circuit 501, a second circuit 503, a third circuit 505 and a fourth circuit 507.

The second circuit 503 determines a target scheduling metric based on channel quality index (CQI) reports 502 of the plurality of mobile stations with respect to a set of reported beam directions and a set of frequency resources.

The third circuit 505 selects a beam direction of the set of reported beam directions based on an optimality criterion with respect to the target scheduling metric.

The fourth circuit 507 allocates the set of frequency resources to the selected beam direction.

The first circuit 501 iteratively repeats 504 the selecting and the allocating based on an update of the target scheduling metric which is determined based on the reported beam directions excluding the selected beam directions.

The first circuit 501 may iteratively repeat 504 the selecting and the allocating based on the update of the target scheduling metric until the update of the target scheduling metric is equal to a predetermined value or all beamformers are scheduled.

The second circuit 503 may determine the target scheduling metric based on a weighted target date rate derived from a channel quality indicator that may be derived from the channel quality index reports.

The scheduling device 500 may include a fifth circuit for determining the optimality criterion based on achieving the target scheduling metric.

Figure 6:
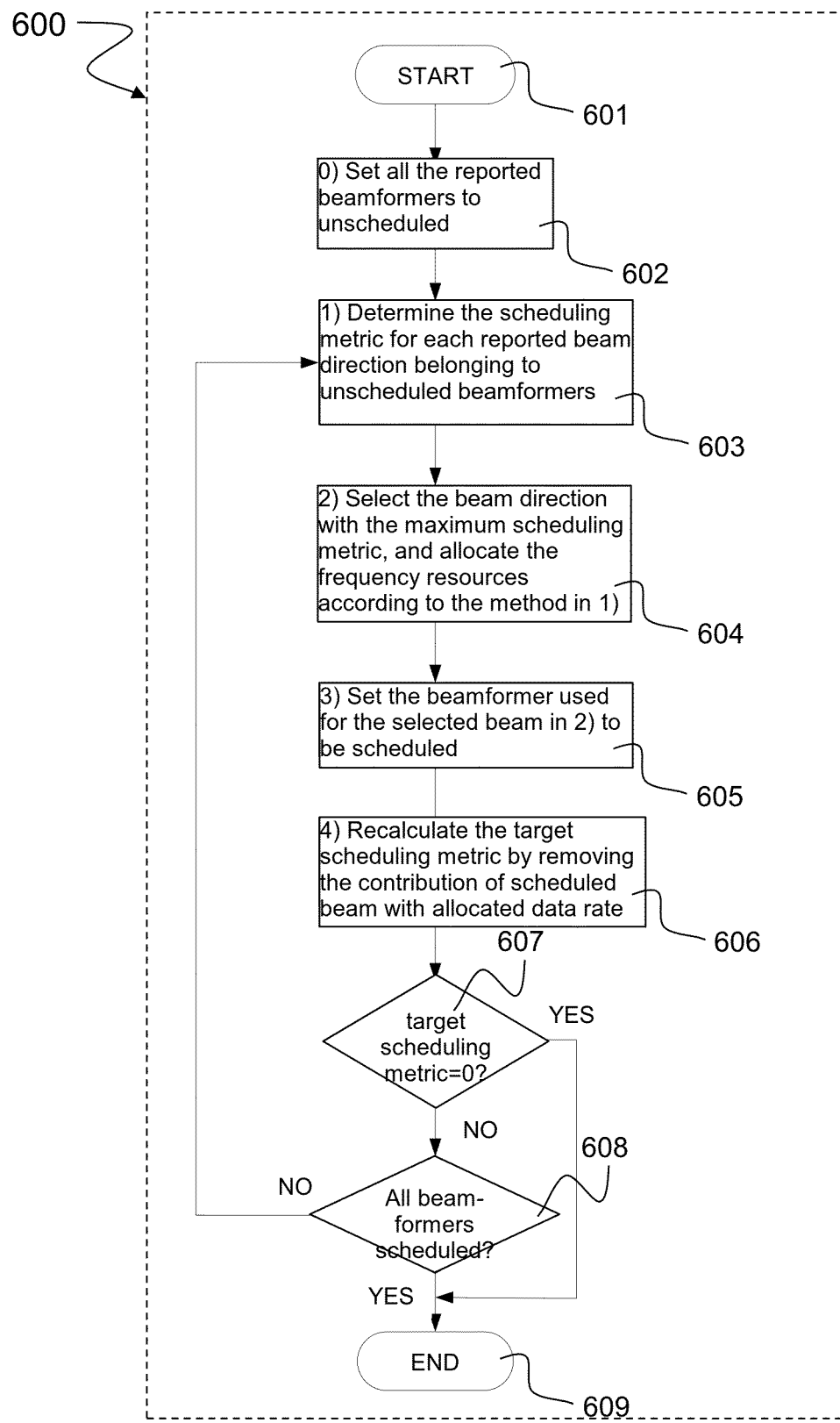
FIG. 6 schematically illustrates an exemplary algorithm 600 of a beam-frequency scheduler.

FIG. 6 schematically illustrates an exemplary algorithm 600 of a beam-frequency scheduler, e.g. of the scheduling circuit 203 described above with respect to FIG. 2 or FIG. 3 or of the scheduling device 500 described above with respect to FIG. 5 or of the scheduling method 400 described above with respect to FIG. 4.

After start 601, in a zeroth block 602 all reported beamformers are set to unscheduled. In a first block 603, the scheduling metric is determined for each reported beam direction belonging to unscheduled beamformers. In a second block 604, the beam directions with the maximum scheduling metric are selected and the frequency resources are allocated according to the operations of the first block 603. In a third block 605, the beamformer used for the selected beam in block 2 is set to be scheduled. In a fourth block 606, the target scheduling metric is recalculated by removing the contribution of scheduled beam with allocated data rate. If a first condition 607 that the target scheduling metric equals zero is fulfilled, the algorithm 600 ends 609, otherwise a second condition 608 is processed. If the second condition 608 that all beamformers are scheduled is fulfilled, the algorithm 600 ends 609, otherwise it jumps to the first block 603.

In the following, an implementation example of the algorithm 600 is described.

In the zeroth block 602, the beam-frequency scheduler sets all the beamformers to be unscheduled. Defining $p_n = (p_{n,1}, \ldots, p_{n,M})$ according to the mathematical beamforming model described below, $\tilde{P} = \bigcup_{n=1}^{N} p_n$ further defines the set of all reported beam directions steered by all unscheduled beamformers. $\tilde{P}$ may be further partitioned into $N_{PB}$ subsets, namely $\tilde{P}_i$, $i=1, 2, \ldots, N_{PB}$, each of which contains all the reported beam directions steered by a particular beamformer.

In the first block 603, for each reported beam direction $\tilde{p} \in \tilde{P}$, the scheduler determines the data rate allocation of each frequency subband to a certain UE so as to maximize the contribution to the target scheduling metric. Assuming that the beam direction $\tilde{p}$ has been reported by K UEs with scheduling priority variable $\tilde{w}_k$, $k=1, \ldots, K$, and target scheduling rate $\tilde{r}_{T,k}$, the subband CQI reports of these UEs are listed in the Table 1.

TABLE 1

Subband CQI reports from K UEs with respect to beam direction $\tilde{p}$

| UE | Subband 1 | Subband 2 | ... | Subband Q |
|---|---|---|---|---|
| UE 1 | $\tilde{q}_{1,1}$ | $\tilde{q}_{1,2}$ | ... | $\tilde{q}_{1,Q}$ |
| UE 2 | $\tilde{q}_{2,1}$ | $\tilde{q}_{2,2}$ | ... | $\tilde{q}_{2,Q}$ |
| ... | ... | ... | ... | ... |
| UE K | $\tilde{q}_{K,1}$ | $\tilde{q}_{K,2}$ | ... | $\tilde{q}_{K,Q}$ |

The following procedure can be used to determine the allocation of each subband to a UE to maximize the target scheduling metric.

1. Set_of_unscheduled_subbands $\psi = \{1, 2, \ldots, Q\}$;
2. Scheduling_metric $\Delta = 0$;
3. for index_of_iterations_for_subband_allocation = 1 : Q
   a. for b = 1: $|\psi|$
      i. $u(b) = \mathrm{argmax}_{k=1:K} \tilde{w}_k \cdot \min\{r_{T,k}, q_{k,\psi}(b)\}$; \\ Select the UE with the maximum scheduling metric contribution for the subband.
      ii. $r(b) = \tilde{w}_{u(b)} \cdot \min\{r_{T,u(b)}, q_{u(b),\psi(b)}\}$; \\ Store the scheduling metric for the subband.
   b. End
   c. $b^* = \mathrm{argmax}_{b=1:|\psi|} r(b)$; \\ Select the subband with the maximum scheduling contribution, which is numbered with the local index in $\psi$.
   d. $b = \psi(b^*)$; \\ Determine the global index of the selected subband.
   e. $\tilde{u}(b) = u(b^*)$; \\ Allocate the subband b to the selected UE.
   f. $\tilde{r}(b) = \min\{\tilde{r}_{T,u(b^*)}, q_{u(b^*),b}\}$; \\ Determine the data rate for the subband b.
   g. $\Delta = \Delta + r(b^*)$; \\ Increase the scheduling metric of the beam by the contribution of the allocated subband.
   h. $\psi = \psi \backslash b$; \\ Remove subband b from the set of unscheduled subbands.
   i. $\tilde{r}_{T,u(b^*)} = \tilde{r}_{T,u(b^*)} - \tilde{r}(b)$; \\ Decrease the target data rate for the selected UE by the allocated data rate for this UE.
4. End The procedure can be represented as a method for allocating a set of beamformer subbands to a plurality of mobile stations, wherein the method includes the following items: providing a set of unscheduled beamformer subbands; setting a scheduling metric to an initial value; repeating the following instructions from an initial iteration index to a size of the set of unscheduled beamformer subbands: selecting for each subband of the set of unscheduled beamformer subbands a mobile station of the plurality of mobile stations for which mobile station a scheduling metric is maximum and storing the scheduling metric; selecting a maximum of the stored scheduling metrics and allocating a subband of the maximum stored scheduling metric to the selected mobile station; computing a data rate for the allocated subband; increasing the scheduling metric by a contribution of the allocated subband; removing the allocated subband from the set of unscheduled subbands; and decreasing a target data rate for the selected mobile station by the data rate computed for the allocated subband.

This procedure generates the following outputs: a) the subband-UE mapping; b) UE data rate allocated to each subband; c) Scheduling metric of this mapping; and d) Residue target data rate of each allocated UE.

In the second block 604, with the output of each beam direction calculated in the first block 603, the beam direction with maximum scheduling metric is selected. And its subband-to-UE allocation and data rate allocation of selected UE in the corresponding subband as well as the residual target date rate of each allocated UE are determined by the outcome of procedure in the first block 603.

In the third block 605, the beamformer steering the selected beam direction in the second block 604 is marked as scheduled beamformer, and all the reported beam directions which are exclusively steered by this scheduled beamformer are removed from the set $\tilde{P}$ of unscheduled beam directions. Taking the scheduled beamformer out of consideration for further steps helps to maximize diversity.

In the fourth block 606, the overall target scheduling metric is updated by employing the residual target data rates for allocated UEs.

In the fifth block 607, if the overall target scheduling metric is 0, or all the beamformers are scheduled, the scheduler stops the operation. Otherwise, the scheduler returns to the first block 603 and continues until either previous stop condition is met.

The above third block 605 only removes those beams exclusively steered by the scheduled beamformer. If all analog beamformers steer the same beam space, then only the selected beam in the second block 604 is removed from the set of unscheduled beam directions.

In the following sections a mathematical modeling of the beamforming techniques described above with respect to FIGS. 1 to 6 is described.

Let N define the number of UEs or bearers being served in the mmW small cell. The target data rate for the nth UE/bearer is defined by $r_{T,n}$, and associated scheduling priority weight factor is denoted by $w_n$. The scheduling priority weight factor determines the priority of the UE to be scheduled in the current TTI, and it ensures the radio resources to be fairly shared among multiple UEs served in the system. For example, it can be obtained by some rule such as proportional fair scheduling method.

Let $N_B$ define the number of beams which can be covered by a mmW small cell (possible grid of beams), and $N_{PB}$ the number of parallel beams which can be simultaneously transmitted by the mmW AP. The set of supported beam indices is defined as $B=(1, 2, \ldots, N_B)$, and beam space covered by the ith analog beamformer is denoted as $B_i$, $1 \leq i \leq N_{PB}$. For example, the mmW AP is equipped with three analog beamformers, each of which is capable of transmitting a pencil beam with the beamwidth of 10° within a dedicated sector of 120°. This setup leads to the definitions of $N_B=36$ and $N_{PB}=3$. In other words, each physical analog beamformer can only transmit 10 beam directions within its sector, and only one beam direction is illuminated at a TTI. As a result, the beam space sets in this setup are $B=(1, 2, \ldots, 36)$, and $B_i(12(i-1)+1, \ldots, 12i)$, $i=1,2,3$.

The channel state information (CSI) feedback from the nth UE includes the set of preferred beam indexes) $p_n=(p_{n,1}, \ldots, p_{n,M})$, where M defines the maximum number of preferred beam indexes reported by a UE, and $p_{n,j}$, $1 \leq p_{n,j} \leq 36$ in the setup described above stands for the preferred beam index. For each beam index $p_{n,j}$, the UE further reports the channel quality index (CQI) vector $q_{n,j}=(q_{n,j,1}, \ldots, q_{n,j,Q})$, where Q refers to number of subbands reported by the UE CQI feedback, and $q_{n,j,i}$, $1 \leq j \leq M$; $1 \leq i \leq Q$ defines the channel quality of the nth UE with respect to the ith reported beam index at the ith subband of the system bandwidth. The CQI can be referred to the achievable data rate at certain target block error rate. The reported CQI matrix from the nth UE can be further defined as $Q_n=(q_{n,1}; \ldots; q_{n,M}) \in R^{M \times Q}$.

The beam-frequency scheduler determines the beam-rate allocation matrix $R_n$ for each UE which can be expressed as follows:

$$R_n = \begin{pmatrix} r_{n,1,1} & \cdots & r_{n,1,Q} \\ \vdots & \ddots & \vdots \\ r_{n,M,1} & \cdots & r_{n,M,Q} \end{pmatrix} \in R^{M \times Q}, \quad (A-1)$$

where $r_{n,j,i}$ stands for the data rate allocated for the nth UE transmitted with the beam index $p_{n,j}$ on the ith frequency subband, it is bounded in the following range:

$$0 \leq r_{n,j,i} \leq q_{n,j,i}, \quad (A-2)$$

and $r_{n,j,i}=0$ indicates that no data for the UE is allocated at the associated beam direction and frequency subband. Typically this will be the case for most of the beams i.e. $R_n$ will be a sparse matrix. The allocated sum rate of each UE is defined as $r_n = \sum_{j=1}^{M} \sum_{i=1}^{Q} r_{n,j,i}$, and it should meet the following constraint:

$$r_n \leq r_{T,n}, \quad (A-3)$$

The optimal beam-frequency scheduling solution is the one to the following optimization problem or scheduling problem:

$$(R_1^+, \ldots, R_N^+) = \max_{R_n, \ldots, R_N} \sum_{n=1}^{N} w_n r_n, \quad (A-4)$$

The feasible solution to (A-1) must respect to the physical constraints from the beam and frequency domains that the frequency resource of a certain subband transmitted from a particular beam direction can be allocated to single UE, and in one TTI at most $N_{PB}$ parallel beams can be transmitted. Moreover, the feasible solution must also take into account the restriction that only one beam direction can be transmitted by any analog beamformer in a TTI. Let $b_n \subseteq p_n$ define the selected beam directions for the nth UE, and one further defines the mapping of $p_n[j]=b_n[i]$, $i=1, 2, \ldots, |b_n|$, and its inverse mapping $j=p_n^{-1}(b_n[i])$. With these definitions, the previously described constraints can be formulated as follows $$|\cup_{n=1}^{N} b_n| \leq N_{PB}, \quad (A-5)$$

where $|\cdot|$ defines the size of the set.

$$|(\cup_{n=1}^{N} b_n) \cap B_i| \leq 1, i=1,2,\ldots,N_{PB} \quad (A-6)$$

For any two UEs, namely the lth and mth UEs, the common allocated beam set is denoted as $c_{l,m}=b_l \cap b_m$, the constraint that any frequency subband in the shared beam direction can be allocated to only one UE, leads to the following expression:

$$r_{l,p_l^{-1}(c_{l,m}[f]),i} \cdot r_{m,p_m^{-1}(c_{l,m}[f]),i} = 0, \quad (A-7)$$

where $f=1, 2, \ldots, |c_{l,m}|$, $i=1, 2, \ldots, Q$.

In a nutshell, the beam-frequency scheduler is to solve the optimization problem described in Eq (A-4) subject to the constraints defined in Eqs. (A-2), (A-3), (A-5), (A-6) and (A-7). It is envisioned that more constraints can possibly be added to the scheduling problem due to further restrictions regarding to the rate allocation due to the UE capability or control signaling overhead. But in this invention, we mainly focus on the current problem, and the proposed method can be straightforwardly extended to more constrained scenarios.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method 400 or the algorithm 600 as described above with respect to FIGS. 4 and 6. Such a computer program product may include a readable storage medium storing program code thereon for use by a processor, the program code comprising instructions for performing any of the method 400 or the algorithm 600 as described above.

EXAMPLES

The following examples pertain to further embodiments. Example 1 is a beamforming device, comprising: a first beamforming circuit configured to generate a first beam based on a first set of beamforming coefficients; a second beamforming circuit configured to generate a second beam based on a second set of beamforming coefficients; and a scheduling circuit configured to allocate a first set of frequency resources, a second set of frequency resources, the first set of beamforming coefficients and the second set of beamforming coefficients to a plurality of mobile stations based on an optimality criterion related to a target scheduling metric.

In Example 2, the subject matter of Example 1 can optionally include that the first set of frequency resources and the second set of frequency resources are at least partially overlapping.

In Example 3, the subject matter of Example 1 or Example 2 can optionally include that the scheduling circuit is configured to allocate the first and second sets of frequency resources and the first and second sets of beamforming coefficients jointly to the plurality of mobile stations.

In Example 4, the subject matter of any one of Examples 1-3 can optionally include that the scheduling circuit is configured to allocate the first and second sets of frequency resources and the first and second sets of beamforming coefficients to the plurality of mobile stations during a same transmission time interval.

In Example 5, the subject matter of any one of Examples 1-3 can optionally include that the scheduling circuit is configured to allocate the first set of frequency resources and the first set of beamforming coefficients for generating the first beam to a first set of mobile stations; and that the scheduling circuit is configured to allocate the second set of frequency resources and the second set of beamforming coefficients for generating the second beam to a second set of mobile stations; and that one or multiple mobile stations are included in both the first set and the second set of mobile stations.

In Example 6, the subject matter of any one of Examples 1-4 can optionally include that the first beamforming circuit and the second beamforming circuit are configured to generate one beam to at least one mobile station of the plurality of mobile stations.

In Example 7, the subject matter of any one of Examples 1-6 can optionally include that a wavelength of the first beam and the second beam is in a millimeter range or a frequency range of the first beam and the second beam lies between about 6 GHz and about 100 GHz.

In Example 8, the subject matter of any one of Examples 1-7 can optionally include that the scheduling circuit is configured to allocate the first and second sets of frequency resources and the first and second sets of beamforming coefficients to direct the first beam and the second beam to different preferred beam directions.

In Example 9, the subject matter of any one of Examples 1-8 can optionally include that the target scheduling metric is based on a weighted target data rate derived from channel quality indicator.

In Example 10, the subject matter of any one of Examples 1-9 can optionally include that the first and second sets of beamforming coefficients are analog beamforming coefficients.

Example 11 is a method for allocating a plurality of beamformers to a plurality of mobile stations, the method comprising: determining a target scheduling metric based on channel quality index (CQI) reports of the plurality of mobile stations with respect to a set of reported beam directions and a set of frequency resources; selecting a beam direction of the set of reported beam directions based on an optimality criterion related to the target scheduling metric; allocating the set of frequency resources to the selected beam direction; and iteratively repeating the selecting and the allocating based on an update of the target scheduling metric which is determined based on the reported beam directions excluding the selected beam directions.

In Example 12, the subject matter of Example 11 can optionally include iteratively repeating the selecting and the allocating based on the update of the target scheduling metric until the update of the target scheduling metric is equal to a predetermined value or all beamformers are scheduled.

In Example 13, the subject matter of any one of Examples 11-12 can optionally include that the target scheduling metric is based on a weighted target date rate derived from the channel quality index reports.

In Example 14, the subject matter of any one of Examples 11-13 can optionally include that the optimality criterion is based on achieving the target scheduling metric.

In Example 15, the subject matter of any one of Examples 11-14 can optionally include that a respective set of frequency resources is assigned to each beamformer.

In Example 16, the subject matter of any one of Examples 11-15 can optionally include that the optimality criterion is subject to the restriction that only one beam direction is transmitted by any one of the plurality of beamformers during a transmission time interval.

In Example 17, the subject matter of any one of Examples 11-16 can optionally include that the optimality criterion is subject to the restriction that the frequency resources in the respective frequency resource set are iteratively selected and allocated to one same or different mobile station based on achieving the target scheduling metric or updated target scheduling metric.

In Example 18, the subject matter of any one of Examples 11-17 can optionally include that the selected beam direction with respect to the target scheduling metric and the selected beam direction with respect to the updated target scheduling metric are directed to different mobile stations of the plurality of mobile stations.

In Example 19, the subject matter of any one of Examples 11-18 can optionally include allocating one frequency resource of the set of frequency resources to at least two mobile stations via different beam directions.

Example 20 is a method for allocating a set of beamformer subbands to a plurality of mobile stations, the method comprising: providing a set of unscheduled beamformer subbands; setting a scheduling metric to an initial value; repeating the following instructions from an initial iteration index to a size of the set of unscheduled beamformer subbands: selecting, for each subband of the set of unscheduled beamformer subbands, a mobile station of the plurality of mobile stations for which a scheduling metric is maximum and storing the scheduling metric of the selected mobile station; selecting a maximum of the stored scheduling metrics and allocating a subband of the set of unscheduled beamformer subbands to the mobile station associated with the maximum of the stored scheduling metrics; computing a data rate for the allocated subband; increasing the scheduling metric by a contribution of the allocated subband; removing the allocated subband from the set of unscheduled subbands; and decreasing a target data rate for the selected mobile station by the data rate computed for the allocated subband.

In Example 21, the subject matter of Example 20 can optionally include generating the following outputs: a mapping of allocated subbands to mobile stations, a scheduling metric of the mapping, data rates for mobile stations allocated to each subband, and a residue target data rate of each allocated mobile station.

Example 22 is a device for allocating a plurality of beamformers to a plurality of mobile stations, the device comprising: a circuit configured to determine a target scheduling metric based on channel quality index (CQI) reports of the plurality of mobile stations with respect to a set of reported beam directions and a set of frequency resources; a circuit configured to select a beam direction of the set of reported beam directions based on an optimality criterion with respect to the target scheduling metric; a circuit configured to allocate the set of frequency resources to the selected beam direction; and a circuit configured to iteratively repeat the selecting and the allocating based on an update of the target scheduling metric which is determined based on the reported beam directions excluding the selected beam directions.

In Example 23, the subject matter of Example 22 can optionally include that the circuit configured to iteratively repeat the selecting and the allocating is configured to iteratively repeat the selecting and the allocating based on the update of the target scheduling metric until the update of the target scheduling metric is equal to a predetermined value or all beamformers are scheduled.

In Example 24, the subject matter of any one of Examples 22-23 can optionally include a circuit configured to determine the target scheduling metric based on a weighted target date rate derived from the channel quality index reports.

In Example 25, the subject matter of any one of Examples 22-24 can optionally include a circuit configured to determine the optimality criterion based on achieving the target scheduling metric.

Example 26 is a computer readable medium on which computer instructions are stored which when executed by a computer, cause the computer to perform the method of one of Examples 11 to 20.

Example 27 is a beamforming system, comprising: a first beamforming device configured to provide a first beam based on a first set of analog beamforming coefficients; a second beamforming device configured to provide a second beam based on a second set of analog beamforming coefficients; and a scheduling device configured to allocate a first set of frequency resources, a second set of frequency resources, the first set of beamforming coefficients and the second set of beamforming coefficients to a plurality of mobile stations according to an optimality criterion with respect to a target scheduling metric.

In Example 28, the subject matter of Example 27 can optionally include that the first set of frequency resources and the second set of frequency resources are at least partially overlapping.

In Example 29, the subject matter of Example 27 or Example 28 can optionally include that the scheduling device is configured to jointly allocate the sets of frequency resources and the sets of beamforming coefficients to the plurality of mobile stations.

In Example 30, the subject matter of any one of Examples 27-29 can optionally include that the scheduling device is configured to allocate the sets of frequency resources and the sets of beamforming coefficients to the plurality of mobile stations at the same transmission time interval.

In Example 31, the subject matter of any one of Examples 27-30 can optionally include that the scheduling device is configured to allocate the first set of frequency resources and the first set of beamforming coefficients for providing the first beam to a first set of mobile stations; and that the scheduling device is configured to allocate the second set of frequency resources and the second set of beamforming coefficients for providing the second beam to a second set of mobile stations; and that one or multiple same mobile stations are included in both the first set and the second set of mobile stations.

In Example 32, the subject matter of any one of Examples 27-31 can optionally include that the first beamforming device and the second beamforming device are configured to provide the same beam to at least one mobile station of the plurality of mobile stations.

In Example 33, the subject matter of any one of Examples 27-32 can optionally include that the beamforming system is implemented as an on-chip system.

Example 34 is a scheduling device for allocating a plurality of beamformers to a plurality of mobile stations, the scheduling device comprising: means for determining a target scheduling metric based on CQI reports of the plurality of mobile stations with respect to a set of reported beam directions and a set of frequency resources; means for selecting a beam direction of the set of reported beam directions based on an optimality criterion with respect to the target scheduling metric; means for allocating the set of frequency resources to the selected beam direction; and means for iteratively repeating the selecting and the allocating based on an update of the target scheduling metric which is determined based on the reported beam directions excluding the selected beam directions.

In Example 35, the subject matter of Example 34 can optionally include means for iteratively repeating the selecting and the allocating based on the update of the target scheduling metric until the update of the target scheduling metric is equal to a predetermined value or all beamformers are scheduled.

In Example 36, the subject matter of any one of Examples 34-35 can optionally include means for providing the target scheduling metric based on a channel quality indicator or based on a weighted target date rate derived from channel quality indicator.

Example 37 is a scheduling system for allocating a plurality of beamformers to a plurality of mobile stations, the scheduling system comprising: a device configured to determine a target scheduling metric based on CQI reports of the plurality of mobile stations with respect to a set of reported beam directions and a set of frequency resources; a device configured to select a beam direction of the set of reported beam directions based on an optimality criterion with respect to the target scheduling metric; a device configured to allocate the set of frequency resources to the selected beam direction; and a device configured to iteratively repeat the selecting and the allocating based on an update of the target scheduling metric which is determined based on the reported beam directions excluding the selected beam directions.

In Example 38, the subject matter of Example 37 can optionally include that the device configured to iteratively repeat the selecting and the allocating is configured to iteratively repeat the selecting and the allocating based on the update of the target scheduling metric until the update of the target scheduling metric is equal to a predetermined value or all beamformers are scheduled.

In Example 39, the subject matter of any one of Examples 37-38 can optionally include a device configured to determine the target scheduling metric based on a weighted target date rate derived from channel quality indicator.

In Example 40, the subject matter of any one of Examples 37-39 can optionally include that the scheduling system is implemented as an on-chip system.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A beamforming device, comprising:
a first beamforming circuit configured to generate a first beam based on a first set of beamforming coefficients;
a second beamforming circuit configured to generate a second beam based on a second set of beamforming coefficients; and
a scheduling circuit configured to allocate a first set of frequency resources, a second set of frequency resources, the first set of beamforming coefficients and the second set of beamforming coefficients to a plurality of mobile stations based on an optimality criterion related to a target scheduling metric,
wherein the scheduling circuit is configured to allocate the first set of frequency resources and the first set of beamforming coefficients for generating the first beam to a first set of mobile stations; and
wherein the scheduling circuit is configured to allocate the second set of frequency resources and the second set of beamforming coefficients for generating the second beam to a second set of mobile stations.

2. The beamforming device of claim 1,
wherein the first set of frequency resources and the second set of frequency resources are at least partially overlapping.

3. The beamforming device of claim 1,
wherein the scheduling circuit is configured to allocate the first and second sets of frequency resources and the first and second sets of beamforming coefficients jointly to the plurality of mobile stations.

4. The beamforming device of claim 1,
wherein the scheduling circuit is configured to allocate the first and second sets of frequency resources and the first and second sets of beamforming coefficients to the plurality of mobile stations during a same transmission time interval.

5. The beamforming device of claim 1,
wherein one or multiple mobile stations are included in both the first set and the second set of mobile stations.

6. The beamforming device of claim 1,
wherein the first beamforming circuit and the second beamforming circuit are configured to generate one beam to at least one mobile station of the plurality of mobile stations.

7. The beamforming device of claim 1,
wherein a wavelength of the first beam and the second beam is in a millimeter range or
wherein a frequency range of the first beam and the second beam lies between about 6 GHz and about 100 GHz.

8. The beamforming device of claim 1,
wherein the scheduling circuit is configured to allocate the first and second sets of frequency resources and the first and second sets of beamforming coefficients to direct the first beam and the second beam to different preferred beam directions.

9. The beamforming device of claim 1,
wherein the target scheduling metric is based on a weighted target data rate derived from channel quality indicator.

10. The beamforming device of claim 1,
wherein the first and second sets of beamforming coefficients are analog beamforming coefficients.

11. A beamforming device, comprising:
a first beamforming circuit configured to generate a first beam based on a first set of beamforming coefficients;
a second beamforming circuit configured to generate a second beam based on a second set of beamforming coefficients; and
a scheduling circuit configured to allocate a first set of frequency resources, a second set of frequency resources, the first set of beamforming coefficients and the second set of beamforming coefficients to a plurality of mobile stations based on an optimality criterion related to a target scheduling metric, wherein the first set of frequency resources and the second set of frequency resources are at least partially overlapping.

12. The beamforming device of claim 11, wherein the scheduling circuit is configured to allocate the first and second sets of frequency resources and the first and second sets of beamforming coefficients jointly to the plurality of mobile stations.

13. The beamforming device of claim 11, wherein the scheduling circuit is configured to allocate the first and second sets of frequency resources and the first and second sets of beamforming coefficients to the plurality of mobile stations during a same transmission time interval.

14. The beamforming device of claim 11, wherein the scheduling circuit is configured to allocate the first set of frequency resources and the first set of beamforming coefficients for generating the first beam to a first set of mobile stations; and
wherein the scheduling circuit is configured to allocate the second set of frequency resources and the second set of beamforming coefficients for generating the second beam to a second set of mobile stations.

15. The beamforming device of claim 14, wherein one or multiple mobile stations are included in both the first set and the second set of mobile stations.

16. The beamforming device of claim 11,
wherein the first beamforming circuit and the second beamforming circuit are configured to generate one beam to at least one mobile station of the plurality of mobile stations.

17. The beamforming device of claim 11,
wherein the scheduling circuit is configured to allocate the first and second sets of frequency resources and the first and second sets of beamforming coefficients to direct the first beam and the second beam to different preferred beam directions.

18. The beamforming device of claim 11,
wherein the target scheduling metric is based on a weighted target data rate derived from channel quality indicator.

19. A beamforming method comprising:
generating a first beam based on a first set of beamforming coefficients;
generating a second beam based on a second set of beamforming coefficients; and
allocating a first set of frequency resources, a second set of frequency resources, the first set of beamforming coefficients and the second set of beamforming coefficients to a plurality of mobile stations based on an optimality criterion related to a target scheduling metric, wherein the allocating further comprises:
allocating the first set of frequency resources and the first set of beamforming coefficients for generating the first beam to a first set of mobile stations; and
allocating the second set of frequency resources and the second set of beamforming coefficients for generating the second beam to a second set of mobile stations.

20. The beamforming method of claim 19, wherein one or multiple mobile stations are included in both the first set and the second set of mobile stations.

21. The beamforming method of claim 19, wherein the first set of frequency resources and the second set of frequency resources are at least partially overlapping.

22. The beamforming method of claim 19, further comprising allocating the first and second sets of frequency resources and the first and second sets of beamforming coefficients jointly to the plurality of mobile stations.

23. The beamforming method of claim 19, further comprising allocating the first and second sets of frequency resources and the first and second sets of beamforming coefficients to the plurality of mobile stations during a same transmission time interval.

24. One or more non-transitory computer readable media including instructions which when executed by a processor of a device, direct the device to:
generate a first beam based on a first set of beamforming coefficients;
generate a second beam based on a second set of beamforming coefficients; and
allocate a first set of frequency resources, a second set of frequency resources, the first set of beamforming coefficients and the second set of beamforming coefficients to a plurality of mobile stations based on an optimality criterion related to a target scheduling metric, wherein the allocating further comprises:
allocating the first set of frequency resources and the first set of beamforming coefficients for generating the first beam to a first set of mobile stations; and
allocating the second set of frequency resources and the second set of beamforming coefficients for generating the second beam to a second set of mobile stations.

25. The one or more non-transitory computer readable media of claim 24, wherein one or multiple mobile stations are included in both the first set and the second set of mobile stations.

* * * * *